April 13, 1943.　　　L. L. JOHNSON　　　2,316,591
VALVE STEM GRINDING ATTACHMENT
Filed Feb. 3, 1941　　　2 Sheets-Sheet 1
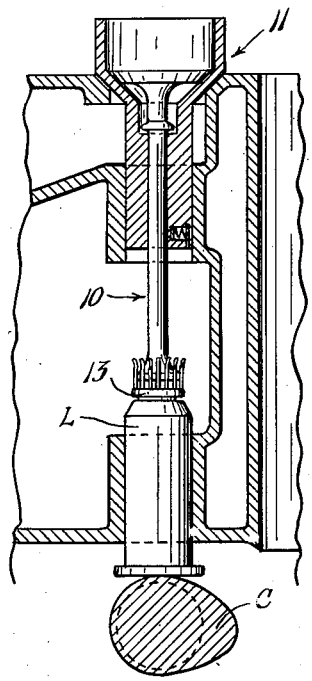
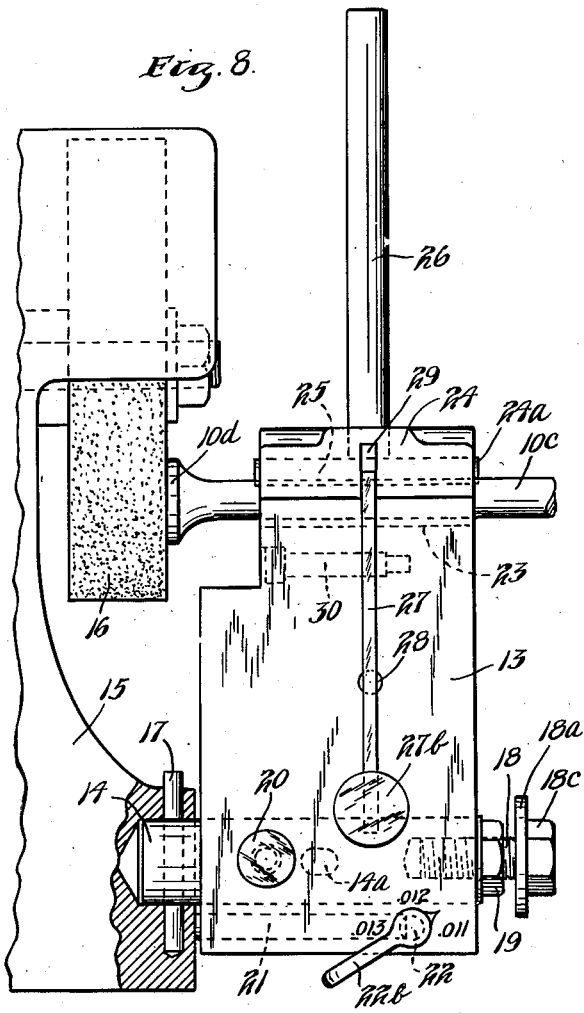
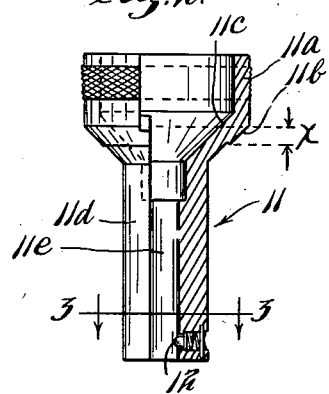
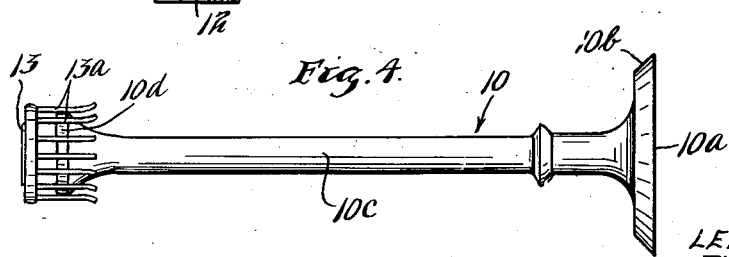
INVENTOR.
LENNART L. JOHNSON.
BY HIS ATTORNEYS.
Williamson & Williamson April 13, 1943. L. L. JOHNSON 2,316,591
VALVE STEM GRINDING ATTACHMENT
Filed Feb. 3, 1941 2 Sheets-Sheet 2
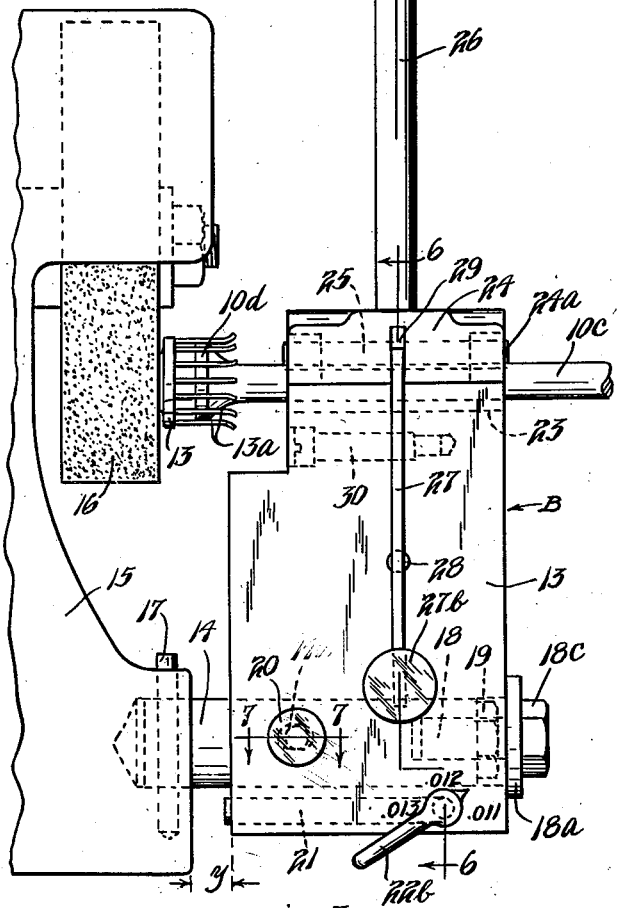
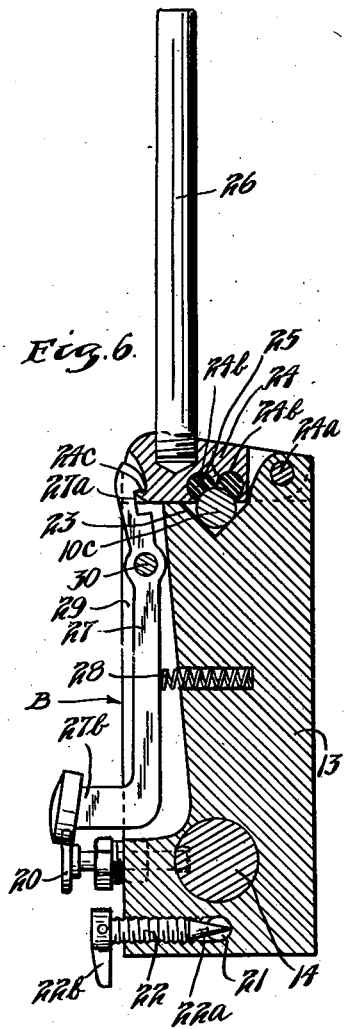
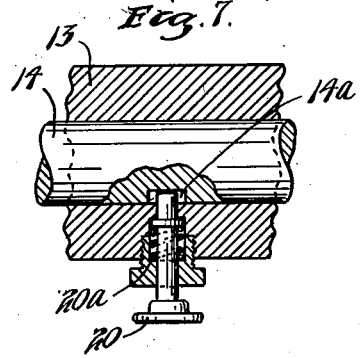
INVENTOR.
LENNART L. JOHNSON.
BY HIS ATTORNEYS.
Williamson & Williamson Patented Apr. 13, 1943

2,316,591

UNITED STATES PATENT OFFICE 2,316,591

VALVE STEM GRINDING ATTACHMENT

Lennart L. Johnson, Minneapolis, Minn.

Application February 3, 1941, Serial No. 377,106

5 Claims. (Cl. 51—124)

This invention relates to the grinding of the stems of poppet valves used in internal combustion engines to accurately adjust the lengths of said stems for proper working relationship and clearance in such engines which do not have adjustable tappets, such as the automobile motors manufactured by the Ford Motor Company.

In engines of this type the distance between the valve lifters or tappet rods and the respective valve seats must be accurately gauged with provision for desired clearance for efficient operation. The butts of the valve stems must then be ground accurately to the gauged, predetermined length for each valve.

Heretofore gauge mechanisms have been utilized to predetermine the length of the valve stems, and actual measurements have been taken between the upper ends of the tappet rods or lifters and the valve seats in the engine block. Such gauge instruments have been utilized in conjunction with related valve carrying carriages to determine the proper position of the valve in the carriage and the range of movement of the carriage with reference to an associated grinding wheel.

Such valve stem adjusting or grinding mechanism extensively used at this time is rather expensive, requires great precision in gauging and in carriage setting operations with a relatively large chance for error occurring in the several steps.

It is an object of my invention to provide a comparatively simple and highly efficient method for accurately adjusting by grinding the stems of poppet valves in engines of the class described wherein the actual valve to be adjusted is utilized as a principal part of the gauge instrument and is cooperatively related with the valve holding carriage or block for grinding to obtain highly accurate results without the existing chances for error through setting of gauge instruments and subsequent setting of carriage and valve to be ground through transference of measurements obtained.

It is a further object to provide simple but highly efficient and accurate apparatus for adjusting the length of poppet valves in engines of the class described including gauging means wherein the valve to be ground is the principal part thereof and closely cooperating grinding mechanism wherein the valve is accurately positioned with a minimum chance for error resulting.

More specifically, it is an object to provide apparatus of the class described comprising first an adapter for receiving the actual valve to be ground and which fits the motor block including the valve seat and stem passage, said apparatus including a frictionally slidable gauge element fitting the butt of the valve stem, such recited parts constituting the gauging instrument; and comprising secondly a valve grinding carriage having a predetermined traveling movement with reference to a grinding wheel, said traveling movement being related to the thickness of said adapter at its valve seat and gauging portion so that the valve acting as the principal part of the gauge instrument of the slidably adjustable gauge element thereon may be transferred to the grinding carriage and set in accurate position on said carriage through the contact of said gauge element with the grinding wheel without additional setting or transferring of gauge measurements.

Another object is the provision of valve stem grinding mechanism including a valve holding carriage associated with a grinding wheel and means for limiting the movement of said carriage through one or more predetermined distances toward said grinding wheel to accurately grind the butt of the stem to the required length allowing for the desired working clearance, the mounting for said carriage providing a predetermined setting position for clamping of said valve thereto and in addition providing for oscillation of said carriage during the grinding movement of said carriage against the grinding wheel.

These and other objects and advantages of my invention will more fully appear from the following description made in connection with the accompanying drawings, wherein like reference characters refer to the same parts throughout the several views, and in which:

Fig. 1 is a section taken on a plane passing through the axis of the valve seat and valve stem passage of an engine block, showing the gauging step of my improved method and the elements of my apparatus constituting my gauge instrument;

Fig. 2 is a view partly in front elevation and partly in vertical section of my gauge adapter detached;

Fig. 3 is a detailed cross section taken on the line 3—3 of Fig. 2;

Fig. 4 is a side elevation of a valve to be ground with gauge cap frictionally attached and set on the butt of the stem;

Fig. 5 is a side elevation of an embodiment of my grinding apparatus showing the carriage locked in setting position for attaching the valve thereto and showing the step of accurately setting the valve in relation to the carriage;

Fig. 6 is a vertical section taken on the line 6—6 of Fig. 5;

Fig. 7 is a detailed horizontal section taken on the lines 7—7 of Fig. 5 showing the means for locking the carriage in valve setting retracted position, and Fig. 8 is a side elevation of my grinding mechanism showing the position of the carriage and valve stem at approximately completion of the grinding operation.

As shown in the drawings, my method and apparatus are applied for the adjustment by gauging and grinding of a poppet valve of a Ford automobile engine. The valve 10 has the usual head 10a having the valve face 10b and the usual stem 10c provided at its lower end with the enlargement or butt 10d constituting an abutment for the coiled spring (not shown) which in operation is interposed between said stem butt and the lower end of the stem guide (not shown). With my method and apparatus each valve to be adjusted in length is used as a principal part of its gauging mechanism. An adapter 11 for fitting the valve seat and valve stem passage is provided having a cup-shaped head 11a provided externally at its lower portion with a beveled face 11b adapted to precisely fit the valve seat of the motor block. Internally the lower portion of the adapter head 11a is coned at 11c to precisely fit, as shown in Fig. 1, the beveled face 10b of the valve. The shank 11d of adapter 11 is externally cylindrical to fit with working clearance the valve stem passage of the block with, of course, the valve stem guide removed therefrom. The internal bore of the shank portion of adapter 11 fits the medial portion 10c of the valve stem with slight working clearance. To enable the valve to be inserted in the adapter a vertical, longitudinal slot 11e of slightly greater width than the diameter of the valve stem 10c is formed through the peripheral wall of adapter 11 extending from end to end thereof. To retain the valve 10 and adapter 11, a small spring pressed stud 12 is nested in a lateral passage adjacent the lower end of adapter 11 in communication with the bore of the adapter shank and with said stud positioned to engage the valve stem beyond the axial center thereof.

Completing my gauge mechanism is an adjustable gauge element frictionally and slidably connectible with the butt 10d of the valve stem. Said adjustable member is in the form of a cage-like cap 13 having a flat-bottom contact surface and provided with a series of circumferentially spaced spring fingers 13a adapted to frictionally engage the valve stem butt 10d. The several fingers 13a are preferably outturned at their upper ends to facilitate attachment of cap 13.

In utilizing my gauge instrument or mechanism comprising the valve 10 to be adjusted, the adapter 11, and the gauge cap 13, the parts are assembled, as shown in Fig. 1, with the cap 13 applied in protracted position with the upper portions of the resilient fingers 13a frictionally engaging the valve stem butt 10d. The adapter and head of the valve are then thrust downwardly with the device disposed on the engine block, the crank shaft of the motor preferably being partially rotated to leave the valve cam C in the position shown in Fig. 1. Downward pressure of the adapter and valve therein causes the gauge cap 13 to be thrust against the upper end of the valve lifter L, adjusting itself to a precise, accurate position for measuring with the valve the distance between the valve lifter and the seat for the valve face. The thickness of the seated portion 11b of the adapter must, of course, be taken into consideration and, as shown in Fig. 2, $x$ represents this thickness taken on a vertical line parallel with the axis of the adapter. Consequently the distance from the bottom of gauge cap 13 to the lower seating line of the valve head 10a represents the accurate desired measurement plus the predetermined distance factor $x$.

Referring now to my grinding mechanism which is closely cooperated with the gauging mechanism (see Figs. 5 to 8, inclusive), I provide a valve holding carriage or block, designated as an entirety by the letter B, mounted on a horizontal stub shaft 14 which is suitably anchored at its inner end to a rigid member such as the heavy base 15 of a conventional grinder. The grinder has an abrasive grinding wheel 16 mounted on a horizontal axis and having its disc face opposed to the inner side of carriage block B. Stud shaft 14, as shown, snugly fits a drilled recess in the base 15, and is secured thereto in a predetermined position by a transverse lock pin 17 which extends diametrically through the inner end of shaft 14. Block carriage B is slidable through a limited movement on stub shaft 14 and also during the grinding operation may be oscillated on said shaft to facilitate grinding and to also enable the gauge cap 13 to be detached after setting and clamping of the valve to be ground in the jaws of the carriage. An adjustable stop bolt 18 carrying an abutment flange 18a and bolt head 18c threadedly engages the tapped outer end of stub shaft 14, and is provided with a lock nut 19 for preventing turning or displacement of the stop bolt after it has been adjusted to the accurate, predetermined position. Lock nut 19, it will be noted, lies within the circumference of stub shaft 14 so that the carriage may be moved outwardly into abutment with the flange 18a for valve setting position, as shown in Fig. 5. A spring pressed retaining bolt 20 is seated in the lower forward portion of one side of the block carriage B, the inner end of said bolt being projectible against the stub shaft and engaging, when the carriage is in its extreme retracted position, as shown in Fig. 5, a locking recess 14a. The said recess at its entrance is of approximately oval-shape, terminating in a circular locking portion to closely fit the extremity of the bolt 20. To lock the carriage in position to accurately set and clamp the valve thereto, as shown in Fig. 5, the carriage, of course, in addition to being retracted must be oscillated on shaft 14 to properly align the bolt with the locking recess 14a, whereupon the cooperating spring 20a projects the bolt to locking position. The front face of carriage block B, at least at its lower portion, lies in a vertical plane from which the stub shaft 14 is extended perpendicularly. For grinding a valve stem to obtain the usual $13/1000$ of an inch clearance this plane front surface acts as the abutment or stop against the opposing vertical surface of the base 15, and stop bolt 18 is adjusted so that the maximum travel of the carriage is equal to the distance $x$, indicated in Fig. 2, of the adapter plus $13/1000$ of an inch. This distance is shown in Fig. 5, as indicated by the letter $y$. To quickly adjust the travel of carriage B and subsequent grinding of the valve to obtain slightly different working clearances, I provide a horizontal stop pin 21 slidably mounted in a drilled passage in the lower end of the block B and disposed beneath the shaft 14 and projectible a very slight distance beyond the abutment front face of the carriage for obtaining working clearances in grinding of less than $13/1000$ of an inch, as shown, for obtaining working clearances between $11/1000$ and $13/1000$ of an inch, the positioning or projection of the forward end of stop pin 21 being regulated by the conical inner extremity 22a of an adjustment screw 22 having a handle arm 22b provided with an indicator at its inner end, said indicator cooperating with circumferentially spaced graduations or numbers on the adjacent side surface of carriage B, and, as shown, indicating the adjusted positions for obtaining working clearances of $11/1000$, $12/1000$ and $13/1000$ of an inch, respectively.

The upper end of carriage block B is provided with a horizontal V-groove 23 extending across the top thereof in a line normal to the flat grinding surface of wheel 16. This V-groove is adapted to receive the stem 10c of the valve to be ground and to constitute one of a pair of cooperative clamping jaws for securing the valve in a predetermined position to the carriage. A swingable clamping jaw 24 is hinged at its ends on trunnions 24a to suitable upstanding lugs formed by the upper end of block B and jaw 24 has formed therein a pair of spaced, tangentially disposed grooves 24b extending normal to the flat face of grinding wheel 16 and from the front end to the rear end of jaw 24. The grooves are formed preferably by drilling the jaw 24 to cause the adjacent bores to communicate adjacent the bottom of the jaw, while defining grooves of slightly greater than semi-circular cross section. Within said grooves small, cylindrical, compressible clamping elements 25 are retained. Either an elongated element or a series of relatively short elements may be utilized for each of the grooves, the elements of the two grooves providing a substantially V-shaped jaw for engagement with the upper surface of a valve stem disposed in the V-groove 23 of the block. An upstanding handle 26 is affixed to the central portion of swingable jaw 24 by which the jaw may be swung downwardly into the closed position and locked therein by a latch and by which also the carriage may be manipulated both for oscillatory movement and longitudinal movement on stub shaft 14 to facilitate grinding. The retaining latch utilized for locking the jaw 24, as shown, comprises a latch lever 27 having a shorter working end provided with a square notch 27a for receiving the locking flange 24c at the lower portion of the free end of jaw 24. The inner end of latch arm 27 is provided with an out-turned handle 27b for releasing the latch, and the latch is urged to locking position by suitable means such as a small coil spring 28 nested in a suitable socket drilled into the appropriate face of the block B. Said face of block B is preferably vertically recessed to form a slot 29 for accommdation of the latch arm. The arm is fulcrumed on a pivot bolt 30 and the edge of the latch portion of the arm is curved to cause camming of the latch into locking engagement when the jaw is forcibly swung downwardly into closed position.

In utilizing my grinding mechanism for accurately adjusting the stem of a poppet valve, the carriage block B is retracted on stub shaft 14 to its limit of outer motion against the abutment flange 18a, as shown in Fig. 5, and the carriage oscillated slightly to dispose the same in vertical position wherein the lock bolt 20 engages the locking recess, retaining the carriage in predetermined position for accurate setting of the stem of the valve therein and subsequent clamping of the valve in set position to the carriage. As shown in Fig. 5, the stem of the valve is disposed horizontally within the V-groove 23 of the carriage block with the flat bottom of the gauge cap 13 just contacting the plane surface of the grinding wheel 16. The movable jaw 24 is then swung downwardly and locked in position tightly holding the valve stem against displacement in the precise position for accurately grinding the butt of the valve stem. In the next step of my method the lock bolt 20 is retracted and with the carriage B still in retracted position it is swung by handle 26 to position the gauge cap 13 at one side of and out of engagement with grinding wheel 16 for removal of the cap.

Thereafter grinding wheel 16 is driven and the carriage is thrust toward the grinding wheel, oscillating the same back and forth with the butt of the valve stem engaging the flat surface of the wheel, and the grinding is thus continued throughout the limit of movement of carriage block B to the position shown in Fig. 8. As shown in Figs. 5 and 8, the adjustment screw 22 has been turned to effect a grinding of the valve for provision of slightly less than $12/1000$ of an inch working clearance, and in such position the abutment pin 21 is protracted beyond the normal abutment face of block B then acting as the abutment in cooperation with the opposed portion of the anchoring base 15. Normally when $13/1000$ working clearance is required, the abutment pin is retracted and its outer end lies flush with the inner face of the carriage.

With my improved method and apparatus it will be observed that the actual measurement or gauging is obtained on the actual valve stem to be ground through the positioning of the valve adapter and gauge cap in the motor block, as shown in Fig. 1, and thereafter with my improved grinding carriage movable through the distance y equal to the thickness of the seated portion of the adapter plus the normal working clearance distance, the valve to be ground with gauge cap applied is accurately positioned and secured to the carriage without danger of error; the gauge cap is next removed and the longitudinal movement of the carriage toward the grinding stone causes longitudinal adjustment of the stem to the precise requirements. It will further be seen that regardless of wear on the grinding surface of the wheel, accurate results will always be obtained, and further a range of various operating clearances may be obtained through the adjustable abutment rod 21.

It will, of course, be understood that various changes may be made in the form, details, arrangement and proportions of the various parts without departing from the scope of my invention.

What is claimed is:

1. Gauging mechanism of the class described for determining the extent of grinding required for the stem of a poppet valve comprising, the valve to be ground, an adapter having an internal seat for engaging the conical face of said valve, and a frictional gauge member slidably connectible with the butt of said valve stem.

2. In grinding mechanism for adjusting the length of a poppet valve stem, a valve holding carriage associated with a grinding wheel, a mounting for said carriage, means for limiting the outward or retracted movement of said carriage, means for limiting the movement of said carriage towards said grinding wheel, said mounting providing for swinging movement of said carriage during its movement towards said grinding wheel, and a clamp on said carriage for securing a valve thereto disposed perpendicularly to the grinding face of said grinding wheel, said clamp comprising a V-shaped channel on the top of said carriage, a movable jaw disposed above said groove having a pair of cooperating, somewhat compressible cylindrical elements disposed in side by side relationship above said groove, and means for retaining said movable jaw in clamping position.

3. Gauging mechanism of the class described for determining the extent of grinding required for the stem of a poppet valve comprising, the valve to be ground, an adapter having an internal seat for engaging the conical face of said valve, and a frictional gauge member slidably connectible with the butt of said valve stem, said gauge member comprising a gauging plate adapted to be disposed substantially parallel to the butt end of said valve stem and a series of upwardly extending prongs circumferentially arranged for frictional engagement with the periphery of the valve stem butt.

4. The method of correcting the length of a poppet valve stem which consists in spacing the valve seating surface a known distance from the valve seat, attaching a gauging element to the valve stem so that the distance from the seating surface of the valve to the gauging surface of the gauging element is equal to the distance from the valve seat to the cooperating valve tappet plus the said known distance, placing the valve together with the gauging element in the workholder of a grinding machine which workholder is spaced a distance from the grinding element of said machine, moving said valve and gauging element as a unit in said workholder until the gauging surface of the gauging element is brought into contact with the grinding element, securing the valve in the workholder, removing the gauging element from the valve stem, and grinding the valve stem while the workholder is moved toward the grinding element through a distance equal to said known distance plus the clearance distance.

5. The method of correcting the length of a poppet valve stem which consists in spacing the valve seating surface a known distance from the valve seat, attaching a gauging element to the valve stem so that the distance from the seating surface of the valve to the gauging surface of the gauging element is equal to the distance from the valve seat to the cooperating valve tappet plus the said known distance, and determining the position of said valve in the workholder of a grinding machine for accurately grinding said valve stem through a distance equal to said known distance plus the clearance distance by utilizing the valve with the gauging element attached in the adjusted position as the gauge.

LENNART L. JOHNSON.